Patented Oct. 9, 1951

2,570,887

UNITED STATES PATENT OFFICE 2,570,887

DICHLORO-DIALKOXY DODECADIENES

Georges E. Tabet, Wilmington, Del., assignor to E. I. du Pont de Nemours and Company, Wilmington, Del., a corporation of Delaware No Drawing. Substituted for abandoned application Serial No. 151,990, March 25, 1950. This application December 13, 1950, Serial No. 200,701

2 Claims. (Cl. 260—615)

This invention relates to 1,12-dichloro-2, 11-dialkoxy-4,8-dodecadiene and a process for preparing the same.

It was known heretofore that certain allylic halides react with nickel carbonyl to form nickel halides and diallylic compounds (Belgian Patent 448,884; Chemical Abstracts 41, 6576 (1947); Prichard and Whitman, U. S. patent application S. N. 97,482, filed June 6, 1949, now Patent Number 2,524,833). In the copending application of I. D. Webb, S. N. 151,985, filed March 25, 1950, it is disclosed that 1,10-dialkoxydecadienes-3,7 can be prepared very readily by subjecting compounds of the class consisting of 3-chloro-5-alkoxypentene-1 and 1-chloro-5-alkoxypentene-2 to the action of nickel carbonyl. It was not known heretofore that allylic halides in which the number of halogen atoms exceeds one, and in which the allylic halogen is not entirely in the terminal positions, could be coupled in this manner by the action of nickel carbonyl. Furthermore, this coupling reaction has not been employed heretofore in the preparation of 1,12-dichloro-2,11-dialkoxy-4,8-dodecadiene from the dichloroethers obtained by addition of alpha, beta-dichloroalkyl ether to butadiene.

An object of this invention is to prepare long chain aliphatic ethers having chlorine atoms substituted in the terminal positions. A more specific object of the invention is to prepare 1,12-dichloro-2,11-diethoxy-4,8-dodecadiene. Other objects of the invention will appear hereinafter.

It has been discovered in accordance with this invention that 1,12-dichloro-2,11-dialkoxy-4,8-dodecadienes can be prepared very readily by subjecting 1,6-dichloro-5-alkoxyhexene-2 to the action of nickel carbonyl. The coupling of the aforesaid 1,6-dichloro-5-alkoxyhexene-2 to form 1,12-dichloro-2,11-dialkoxy-4,8-dodecadiene is thus effected very readily in excellent yield at ordinary temperatures and pressures. The alkoxy groups may contain, for example, from 1 to 20 C atoms. If desired, an inert organic solvent may be employed. The nature of the inert organic diluent is not at all critical, suitable diluents being aromatic hydrocarbons, aliphatic hydrocarbons, dialkyl ethers, alkanols, esters, and the like. A convenient solvent which may be used effectively in the practice of the invention is methanol.

The reaction between alpha, beta-dichloroethyl ether and butadiene has been reported by A. N. Pudovik (Izvest. Akad. Nauk. s. s. s. r. Otdel. Khim. Nauk. 529-35 (1948) No. 5, Sept.-Oct.). In carrying out the preparation of these adducts one thousand grams of alpha, beta-dichloroethyl ether, 832 grams of butadiene and 15 grams of fused zinc chloride were charged into a stainless steel one-gallon autoclave. The mixture was stirred for 48 hours while the temperature was maintained at 3° to 5° C. The product was discharged and the autoclave was washed with ether; the product and ether wash were combined and the mixture was washed well with water. The product was then washed with dilute sodium carbonate solution to remove traces of zinc compounds. The organic layer was dried over anhydrous calcium chloride and the solution, after drying, was filtered and distilled. After recovery of volatile solvents and small amounts of low boilers, a first fraction weighing 146.9 grams boiling at 71° to 80° at 3 mm. of mercury was collected; this consisted mainly of the 1,2-adduct of the formula

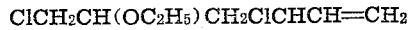

A second fraction weighing 536.6 grams, boiling at 98° to 102° C. at 3 to 4 mm. of mercury, consisted mainly of the 1,4-adduct of the formula,

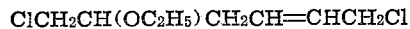

By employing ethers in which the alkyl group is methyl, propyl, isobutyl, tert. amyl, cetyl, 3,3,5-trimethylhexyl, octadecyl, etc., in place of ethyl in the formula given above, the corresponding homologues are obtained.

The coupling of 1,6-dichloro-5-ethoxyhexene-2 in the presence of nickel carbonyl may be written as follows:

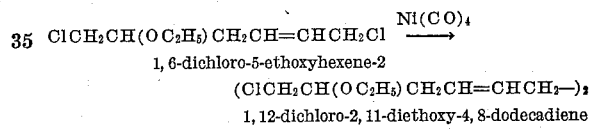

In practicing the invention it is generally preferred to employ a temperature within the range of 0° to 150° C., excellent results being obtained at temperatures within the range of 10° to 75° C.

One mol of nickel carbonyl is consumed, and on mol of nickel chloride is produced for each mol of 1,12-dichloro-2,11-dialkoxy-4,8-dodecadiene formed in the process of the invention. It is therefore highly desirable to employ substantial quantities of nickel carbonyl, preferably at least one mol of nickel carbonyl per 0.5 mol of the 1,6-dichloro-5-alkoxyhexene-2.

The invention is illustrated further by means of the following example.

*Example.*—Into a three-neck flask fitted with stirrer, dropping funnel, and condenser, a mixture of 100 grams of nickel carbonyl and 200 cc.

of methanol was introduced. The mixture was stirred and warmed to approximately 50° C. To this mixture was slowly added another mixture consisting of 197 grams of 1,6-dichloro-5-ethoxy-hexene-2 and 300 cc. of methanol. The temperature was maintained at about 50° to 55° C., and addition was continued as the reaction progressed. During the course of the reaction the reaction mixture had an olive green color, and upon completion of the reaction the solution became clear due to the settling of nickel chloride at the bottom of the flask. There was a lively evolution of carbon monoxide during the reaction. The true product was filtered and washed with aqueous alkali after which the wash was extracted with benzene. The benzene layer was separated, dried over anhydrous potassium carbonate, filtered, and distilled. A virtually quantitative yield of 1,12-dichloro-2,11-diethoxy-4,8-dodecadiene, boiling at 178° C./2 mm. ($N_D^{28}$= 1.4750), was obtained. The iodine number of 157 and the per cent chlorine of 21.7 agreed very closely with the theoretical values of 157.7 and 21.8%, respectively.

The product obtained in the practice of this invention is especially valuable and useful in the manufacture of diquaternary salts, including the diquaternary salts obtained by reaction between the dihalide and trimethylamine or pyridine, suitably in an inert organic solvent such as methanol. These latter compounds are active insecticidal and bactericidal agents. The dihalides may also be employed in the manufacture of dibasic acids by carbonylation of the C-Cl linkages, using methods which are known to be effective for the carbonylation of organic halides to acyl halides and carboxylic acids. This compound may also be converted to the dinitrile by reaction with sodium cyanide in a methyl glycol ether medium, and the dinitrile in turn can be hydrogenated (to the diamine) or saponified to the dibasic acid.

This application is a substitute of my application S. N. 151,990, filed March 25, 1950 which has been abandoned.

I claim:
1. 1,12-dichloro-2,11-dialkoxy-4,8-dodecadiene.
2. 1,12-dichloro-2,11-diethoxy-4,8-dodecadiene.

GEORGES E. TABET.

REFERENCES CITED

The following references are of record in the file of this patent:

UNITED STATES PATENTS

| Number | Name | Date |
| --- | --- | --- |
| 2,290,462 | Allen et al. | July 21, 1942 |